US005822130A

United States Patent [19]

Nagano et al.

[11] Patent Number: 5,822,130

[45] Date of Patent: Oct. 13, 1998

[54] EXPOSURE EQUIPMENT FOR DISPLAY TUBE FABRICATION

[75] Inventors: Hiroyuki Nagano; Takashi Inoue; Kazuo Ueno; Shohroh Mochida; Shuji Ueda; Osamu Adachi, all of Osaka, Japan

[73] Assignee: Matsushita Electric Industrial Co., Ltd., Osaka, Japan

[21] Appl. No.: 613,101

[22] Filed: Mar. 8, 1996

[30] Foreign Application Priority Data

Mar. 8, 1995 [JP] Japan .................................. 7-048866

[51] Int. Cl.[6] .......................... G02B 13/08; G02B 41/00; G03C 5/00

[52] U.S. Cl. ............................ 359/668; 396/546; 430/24

[58] Field of Search .................................... 359/668–671, 359/663; 396/546; 430/24, 26

[56] References Cited

U.S. PATENT DOCUMENTS 3,504,599 4/1970 Barten .................................... 396/546
3,587,417 6/1971 Balder et al. .......................... 396/546
4,078,239 3/1978 Prazak et al. .......................... 396/546

FOREIGN PATENT DOCUMENTS 0 382 308 8/1990 European Pat. Off. .
27 55 294 6/1978 Germany .

*Primary Examiner*—Scott J. Sugarman
*Attorney, Agent, or Firm*—Wenderoth, Lind & Ponack, L.L.P.

[57] ABSTRACT

Light radiated from a light source is gathered by an oval mirror. The gathered light is incident on one end of a rod-shaped optical integrator, integrated and made uniform within the optical integrator, and is radiated from the other end of the optical integrator. The light from the optical integrator is diffused and projected on an exposure area of a display tube by a lens system. The lens system presents an astigmatism, thereby forming a first virtual focus and a second virtual focus on its virtual image area. The diffused light is apparently diffused vertically at the first virtual focus and apparently diffused horizontally at the second virtual focus. The first vertical focus and the second vertical focus correspond respectively in position to the positions of the vertical deflection means and horizontal deflection means of the display tube. Therefore, the directions of the exposure light beams which shed light on green, blue, and red dots are in agreement with the directions of the deflected electron beams. As a result, the deflected electron beams can sweep over the green, blue, and red dots accurately in synchronization with image signals.

14 Claims, 12 Drawing Sheets

EXPOSURE EQUIPMENT FOR DISPLAY TUBE FABRICATION

FIELD OF THE INVENTION

The present invention relates to exposure equipment that is used in fabrication of display tubes, such as CRT's (cathode ray tubes) and the like.

BACKGROUND OF THE INVENTION

Fluorescent dots of a display tube are formed by applying a photoresist, including fluorescent materials, to the inner surface of the display tube, and exposing the photoresist to light through a mask having a specified dot pattern, and then illuminating the photoresist not exposed to light using a solvent. The fluorescent dots exposed to light are hardened and fixed on the inner surface of the display tube. In the case of a color display tube, green (G), blue (B) and red (R) fluorescent materials are contained in each respective photoresist. Each pixel of the color display tube includes green, blue, and red dots. These green, blue, and red dots, and a black matrix (BM) for separating the green, blue, and red dots from one another for a clear image display is formed along with the green, blue, and red dots in succession according to the production process as describe above.

FIGS. 14A and 14B, and FIG. 15 show an exposure system as used in a prior art production process. The light from a rod-shaped mercury lamp 30 is diffused through a narrow slit 31 formed horizontally on a cover 29. The light passes through a lens 32 for an optical correction and a mask 33, and is incident on the exposure area 35 situated on the inner surface of a display tube 34. In order to simplify the drawing, FIG. 15 does not show the lens 32 for an optical correction.

FIGS. 14A and 14B illustrate the manner in which the exposure light is horizontally diffused. The exposure light beams are diffused in the horizontal direction from a point of origin f1 for horizontal diffusion, which coincides in position with the center of the mercury lamp 30.

FIG. 15 illustrates the manner in which the exposure light is vertically diffused. The exposure light beams are diffused in the vertical direction from a point of origin f2 for vertical diffusion located in the slit 31.

The horizontal diffusion angle and the vertical diffusion angle of the exposure light beams are established according to the horizontal deflection angle and vertical deflection angle respectively of electron beams which are to be utilized when the display tube is actually put to use. When the display tube is actually used, the electron beams are accelerated by a horizontal deflection means and horizontally deflected at the point of origin for horizontal deflection, and at the same time are accelerated by a vertical deflection means and vertically deflected at the point of origin for vertical deflection. The points of origin for horizontal deflection and vertical deflection correspond in position to the positions of the horizontal deflection means and vertical deflection means, respectively.

The points of origin f1 and f2 for horizontal diffusion and vertical diffusion of the exposure light respectively, as illustrated in FIGS. 14A and 14B and FIG. 15, are established so as to coincide with the points of origin for horizontal deflection and vertical deflection, respectively. Since the horizontal deflection means and vertical deflection means of a display tube usually undergo displacement in the axial direction, f1 and f2 are also displaced in the axial direction by a distance S.

By establishing the positions of f1 and f2 and the diffusion angles of exposure light as described above, the exposure light beam for shedding light on the green, blue, and red dots is projected on each respective exposure area in the same direction as the corresponding deflected electron beam. As a result, the deflected electron beam can sweep accurately over the green, blue, and red dots in synchronization with image signals when the display tube is actually used. However, in the prior art, much of the light radiated from the mercury lamp 30 is blocked by the cover 29. The result is that a relatively long exposure time is required due to an insufficient amount of exposure light. The present invention provides exposure equipment that is capable of completing an exposure process in a short period by use of a sufficient amount of exposure light.

SUMMARY OF THE INVENTION

The present invention provides exposure equipment for display tube fabrication. The exposure equipment of the present invention includes an illuminating means which gathers light generated by a light source and integrates the gathered light via an optical integrator so that a uniform light is radiated from the illuminating means. The equipment also includes a lens system for diffusing the spot light and for projecting the diffused light onto the exposure area of a display tube. The lens system has an astigmatism, thereby forming a first virtual focus and a second virtual focus in the virtual image area of the lens system. The first and second virtual focuses are located at positions corresponding to those of a vertical and horizontal deflection means respectively of the finished display tube. The exposure light is diffused vertically such that it appears to be diffused at the first virtual focus and is diffused horizontally such that it appears to be diffused at the second virtual focus.

The exposure light beam, which sheds light on the green, blue, and red dots, is projected on the exposure area of the display tube via the foregoing lens system in the same direction as a deflected electron beam used in the completed display tube. The lens system has an astigmatism that provides the first virtual focus and the second virtual focus in the virtual image area of the lens system. As a result, the deflected electron beam can sweep accurately over the green, blue, and red dots in synchronization with image signals when the display tube is actually put to use.

The exposure equipment of the present invention effectively uses almost all the light radiated from the light source for light exposure, thereby making a high brightness exposure possible. Therefore, the time required for exposure is greatly shortened and fabrication cost of display tubes is reduced.

A rod-shaped optical integrator made of glass is used in the exemplary embodiment of the present invention. The function of the rod-shaped optical integrator is to integrate the incident light by repeatedly reflecting light in the interior of the integrator, thereby radiating light with a uniform distribution of light intensity. The rod-shaped optical integrator as described above has benefits of being compact in size and low in cost.

DETAILED DESCRIPTION OF THE INVENTION

Figure 1:
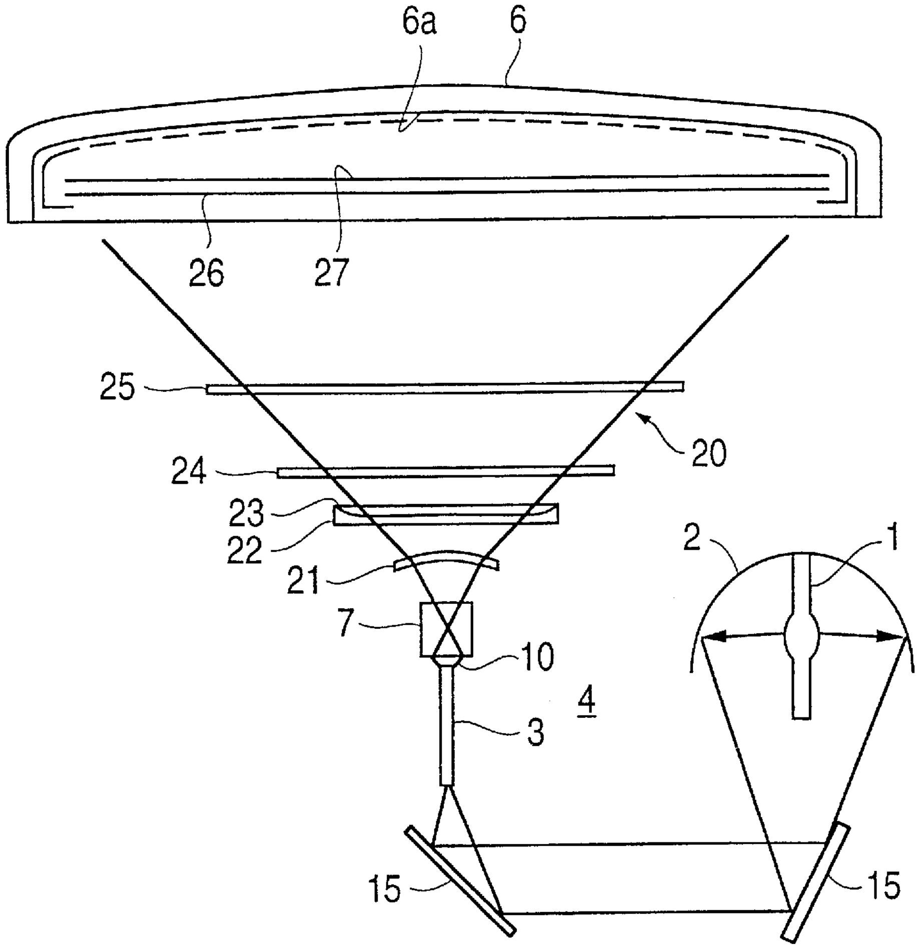
FIG. 1 shows an exemplary embodiment of exposure equipment of the present invention.

FIG. 1 shows exposure equipment as an exemplary embodiment of the present invention. The exposure equipment includes an illumination means 4 and a lens system 7. In the illumination means 4, light radiated from an ultra-high voltage mercury lamp 1 is focused by an oval mirror 2. The focused light is reflected by cold mirrors 15 onto one end of a rod-shaped light integrator 3 made of rod-shaped glass, quartz glass or the like. The light is integrated by repeated reflections that take place inside the rod-like structure. Integrated uniform light is then radiated from the other end of the light integrator 3. The lens system 7 projects the light 10 radiated from the light integrator 3 onto the exposure area 6*a* of a display tube 6.

Figure 2:
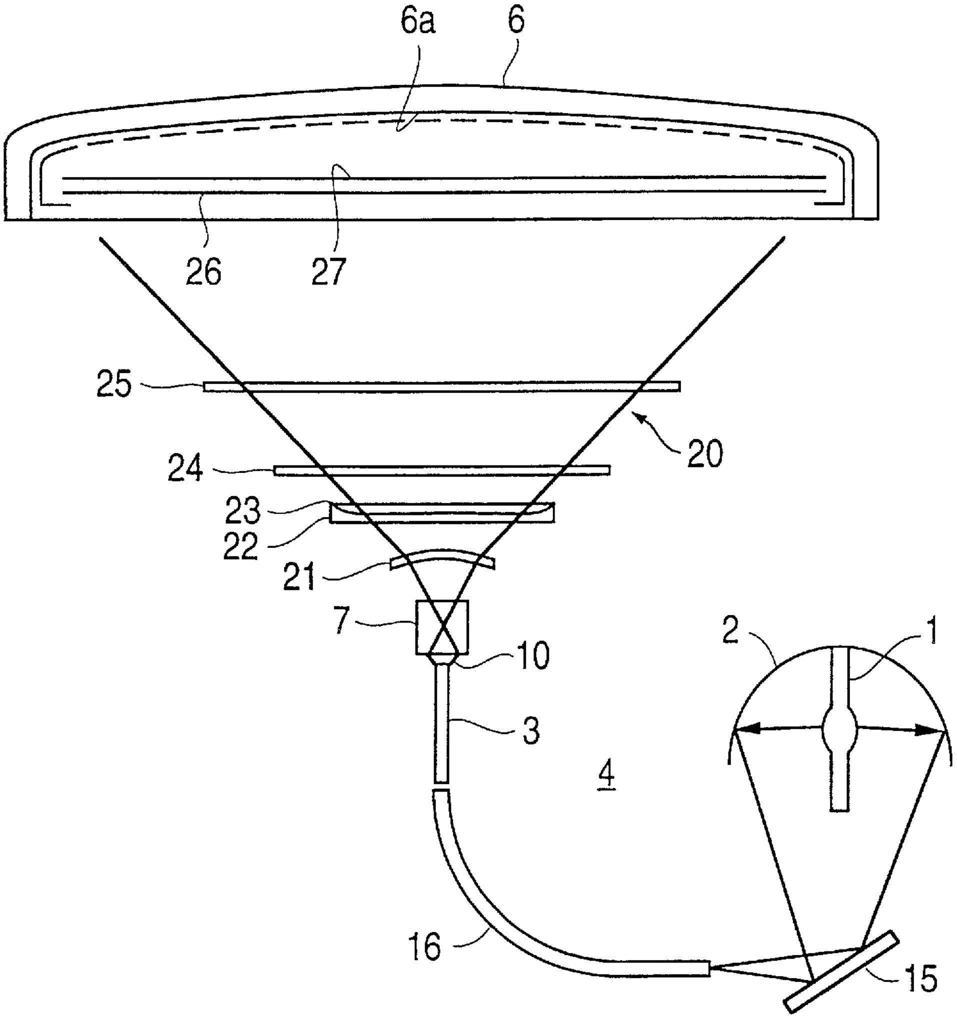
FIG. 2 shows another exemplary embodiment of exposure equipment of the present invention, wherein an optical fiber is used to transmit gathered light.

FIG. 2 shows an illumination means 4 as another exemplary embodiment of the present invention. The light focused by oval mirror 2 is reflected by a single cold mirror 15 onto one end of a rod-shaped optical integrator 3 after passing through an optical fiber 16. The optical fiber 16 prevents interference caused by light from other sources. The use of the optical fiber allows the oval mirror 2 to be located at a position that enables the exposure equipment to be made much smaller.

Figure 4:
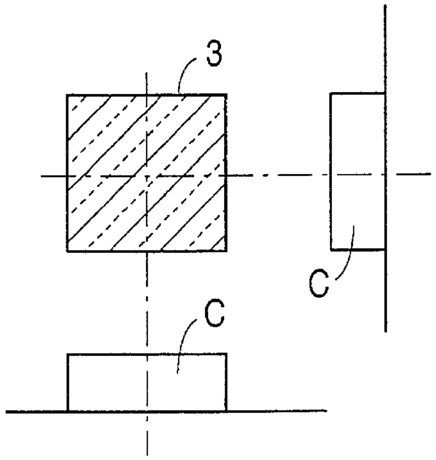
FIG. 4 shows radiant light from an optical integrator. The radiant light is uniform in its light intensity distribution due to light integration performed within the optical integrator.

The rod-shaped optical integrator 3 integrates the light incident on its end by repeated reflections within its interior. The optical integrator 3 radiates light with a uniform distribution C of light intensity as shown in FIG. 4. The optical integrator that produces the distribution of FIG. 4 has a square-shaped cross-section, but it is also possible to make the integrator in a different shape such as a triangle or a circle, for example. Furthermore, the optical integrator 3 can be replaced by a combined assembly of a fly eye lens and an aspheric mirror. However, the rod-shaped optical integrator 3 has a simpler structure and is therefore more beneficial in terms of compactness and low cost.

Light radiated from the optical integrator 3 is projected on the exposure area 6a of the display tube 6 by the lens system 7. An optical correction means 20, which includes a cylindrical lens 21, a P lens 22, an X axis filter 23, a S lens 24, an S correction filter 25, a main filter 26 and an ND filter 27, is placed between the lens system 7 and the exposure area 6*a*. Since the exposure equipment of the present invention effectively uses almost all of the light radiated from the light source for the purpose of exposure, it is possible to achieve an exposure having a high degree of brightness.

As a result, the time required for exposure is significantly reduced and the production costs of resulting display tubes are also reduced.

Figure 3:
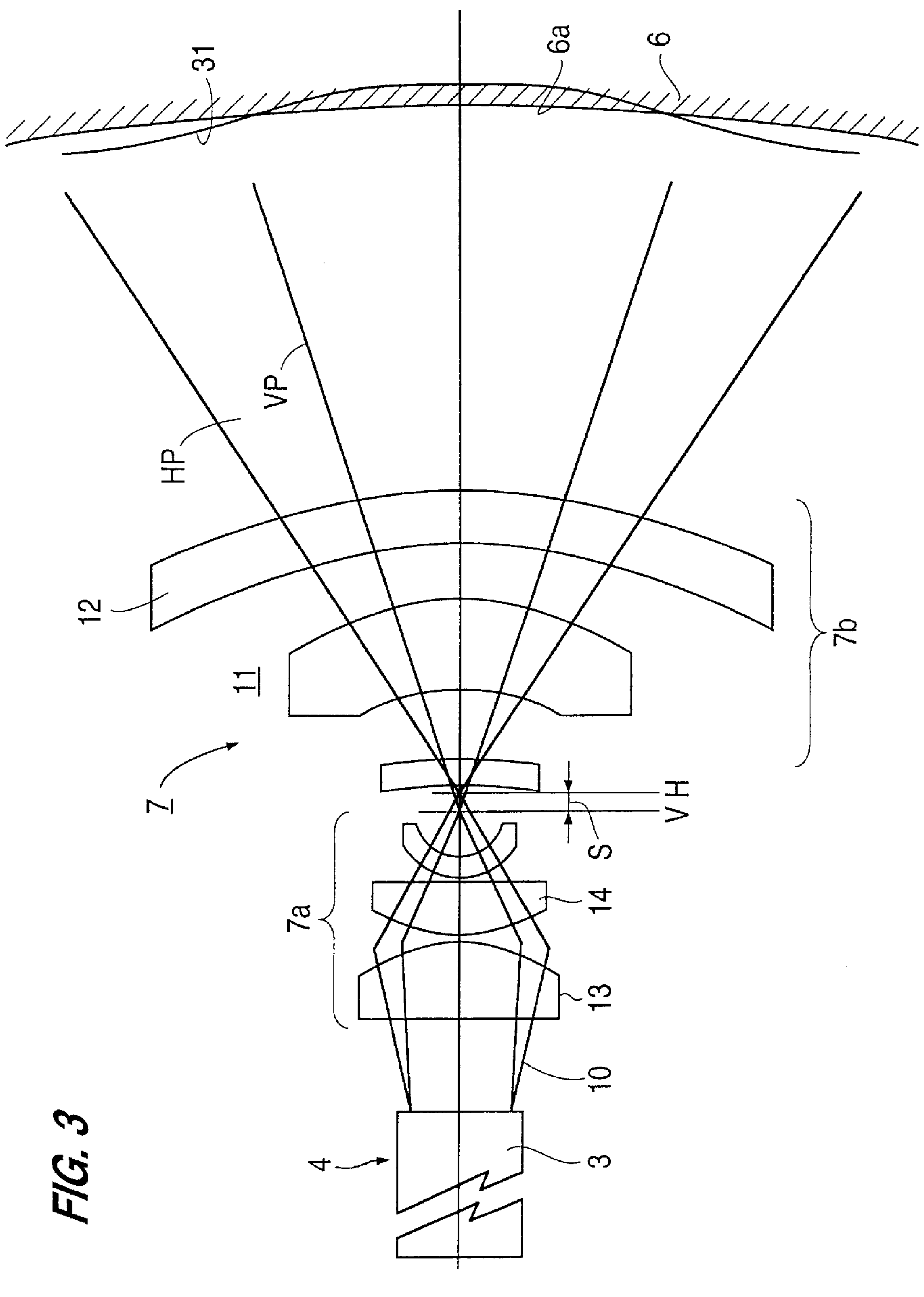
FIG. 3 shows a lens system to diffuse the exposure light.

FIG. 3 shows the lens system 7 including an aperture lens 7*a* and a projection lens 7*b*. The aperture lens 7*a* focuses the light from the illumination means 4 into a spot light having a specified shape that is suitable for exposure. An aperture means that adjusts the lens opening to a specified shape can be inserted in this aperture lens 7*a*, if so desired.

The projection lens 7*b* projects the light gathered by the aperture lens 7*a* onto the exposure area 6*a* of the display tube 6. The projected light is composed of vertical diffusion light VP that diffuses in the direction of vertical deflection and horizontal diffusion light HP that diffuses in the direction of horizontal deflection. The lens system 7 has an astigmatism so that points of origin V and H of virtual images are formed in the virtual image area of the lens.

As shown in FIG. 3, the vertical diffusion light VP and the horizontal diffusion light HP appear as if they are diffused from the points V and H respectively, since the points V and H serve as the points of origin for virtual images.

The points V and H are arranged so as to correspond in position to the points of origin of the vertical deflection and horizontal deflection, respectively, of the electron beam of the display when it is put into use.

Furthermore, the horizontal and vertical diffusion angles of the exposure light are formed so as to correspond to the horizontal and vertical deflection angles respectively of the electron beam when the display tube is actually put to use. Therefore, the beams of the vertical diffusion light VP and the horizontal diffusion light HP of the present exposure apparatus are projected onto the exposure area of the display tube in the same directions as the electron beams which will be projected when the display is put into use. As a result, when the display tube is actually put to use, the deflected electron beams can sweep over the green, blue, and red dots of the display accurately in synchronization with image signals.

The foregoing points of origin V and H for virtual images are displaced by a distance S corresponding to the displacements of the vertical and horizontal deflection means of the electron beams. Since the vertical deflection means is located closer to the light integrator 3 than the horizontal deflection means in the present exemplary embodiment, the point of origin V for virtual image is arranged closer to the aperture integrator 3 than the point of origin H for virtual image.

If the positions of the vertical deflection means and horizontal deflection means are reversed, the positions of the point of origin V for virtual image and point of origin H for virtual image will be also reversed.

A variety of lens designs can realize the points of origin V and H for virtual images as described above. In FIG. 3, the point of origin V for the virtual image is realized by a combination of anamorphic lenses 13 and 14, and the point of origin H for the virtual image is realized by a combination of anamorphic lenses 11 and 12.

Various kinds of lens designs such as cylindrical, toroidal, toric and the like, for example, can be used to make the anamorphic lenses 11 to 14.

In the case of a display tube of 21 includes in size (448 mm in horizontal width) for example, a good result was obtained by the following specification:

The distance between the tip of optical integrator 3 and the exposure surface=32.5 mm The horizontal diffusion angle of exposure light=36°

The vertical diffusion angle of exposure light=24°

The positional displacement of the points of origin V and H for virtual images=7 mm Dimensions of the optical integrator=6 mm square The light gathered by the aperture lens 7*a*=2 mm square The exposure light sometimes forms images on a deformed imaging surface 31, resulting in nonuniform light exposure. An ND filter 27 as shown in FIG. 1 corrects the foregoing nonuniform light exposure in concert with a main filter 26 installed to correct nonuniformity in exposure in the periphery and also the central part of the imaging surface. Furthermore, the main filter 26 corrects nonuniform light exposure so that the nonuniformity does not harm the practical use of the display tube, even when the exposure light used does not focus correctly on the exposure area 6*a*.

Figure 5A:
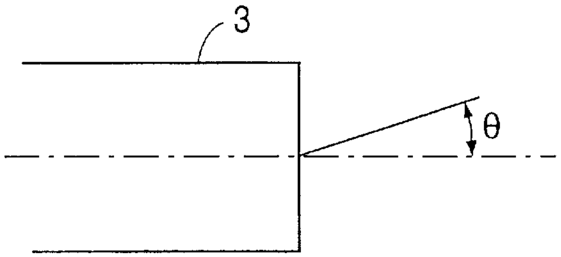
FIGS. 5A and 5B show the relation between radiant angle θ and light intensity I from the optical integrator.
Figure 5B:
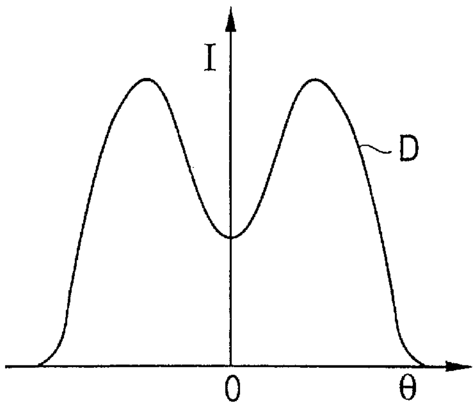
Figure 6:
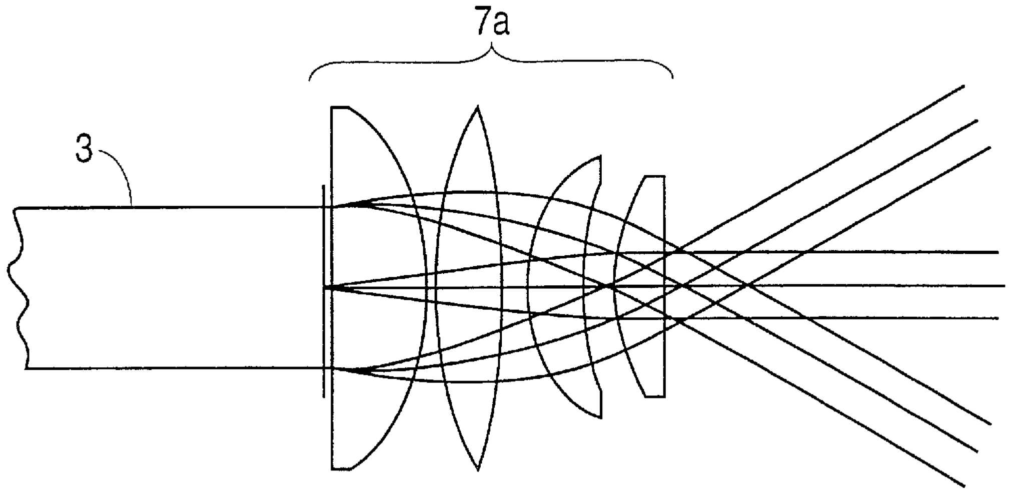
FIG. 6 shows radiant light from a telecentric lens system.
Figures 8A, 8B:
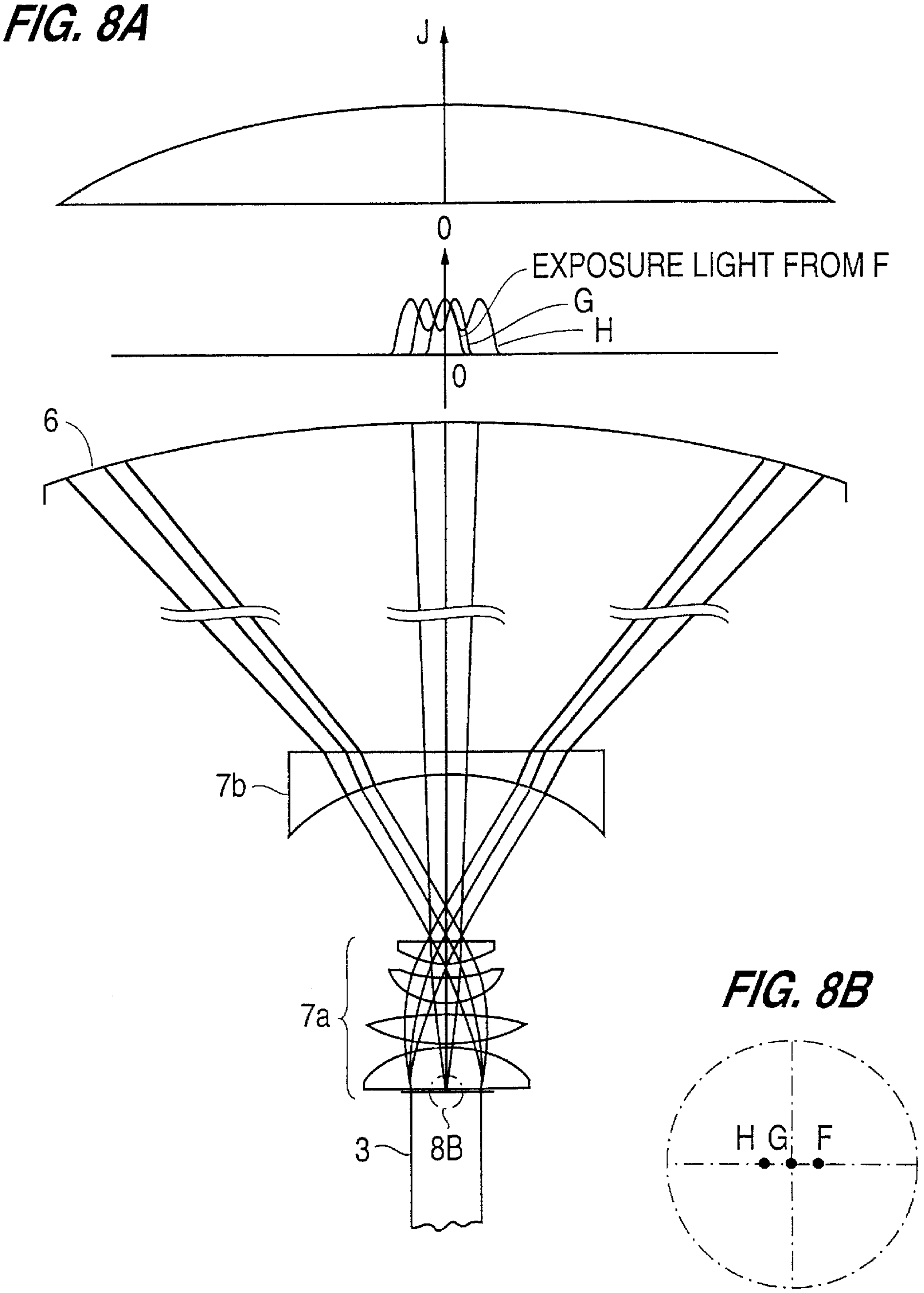
FIG. 8A and 8B show light intensity distribution on an exposure area of integrated radiant light from a radiant point of an optical integrator.

When radiant light from optical integrator 3 has a light intensity which is dependent on radiant angle θ, as shown in distribution D of FIG. 5, a telecentric lens system is preferable as an aperture lens. As shown in FIG. 6, the telecentric lens system of an aperture lens converts the radiant light from a respective point within a specified radiant angle of an optical integrator into a parallel light flux. As a result, the entire exposure area can be exposed to a smooth light intensity J as shown in FIG. 8A.

Figure 7:
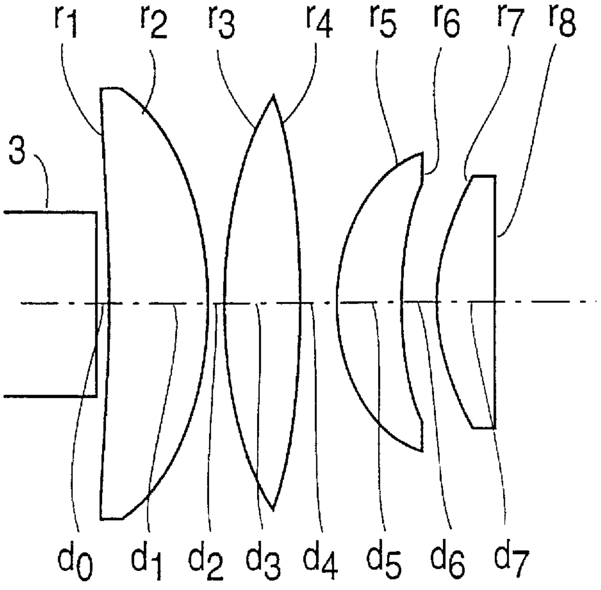
FIG. 7 shows a telecentric lens system.

FIG. 7 shows an example of a telecentric lens system.

The focus distance is 5.7 mm and F number is 2.37. The following table shows design dimensions.

| curvature radius (mm) | distance (mm) | refraction index |
|---|---|---|
| | d0 = 0.075401 | |
| r1 = −9.36859 | d1 = 0.584359 | n1 = 1.45847 |
| r2 = −1.50802 | d2 = 0.037701 | |
| r3 = 2.86571 | d3 = 0.433656 | n2 = 1.45847 |
| r4 = −4.91427 | d4 = 0.169652 | |
| r5 = 0.96136 | d5 = 0.395856 | n3 = 1.45847 |
| r6 = 2.95949 | d6 = 0.169652 | |
| r7 = 1.16872 | d7 = 0.320455 | n4 = 1.45847 |
| r8 = 7.58724 | d8 = 0.075401 | |

Figure 9:
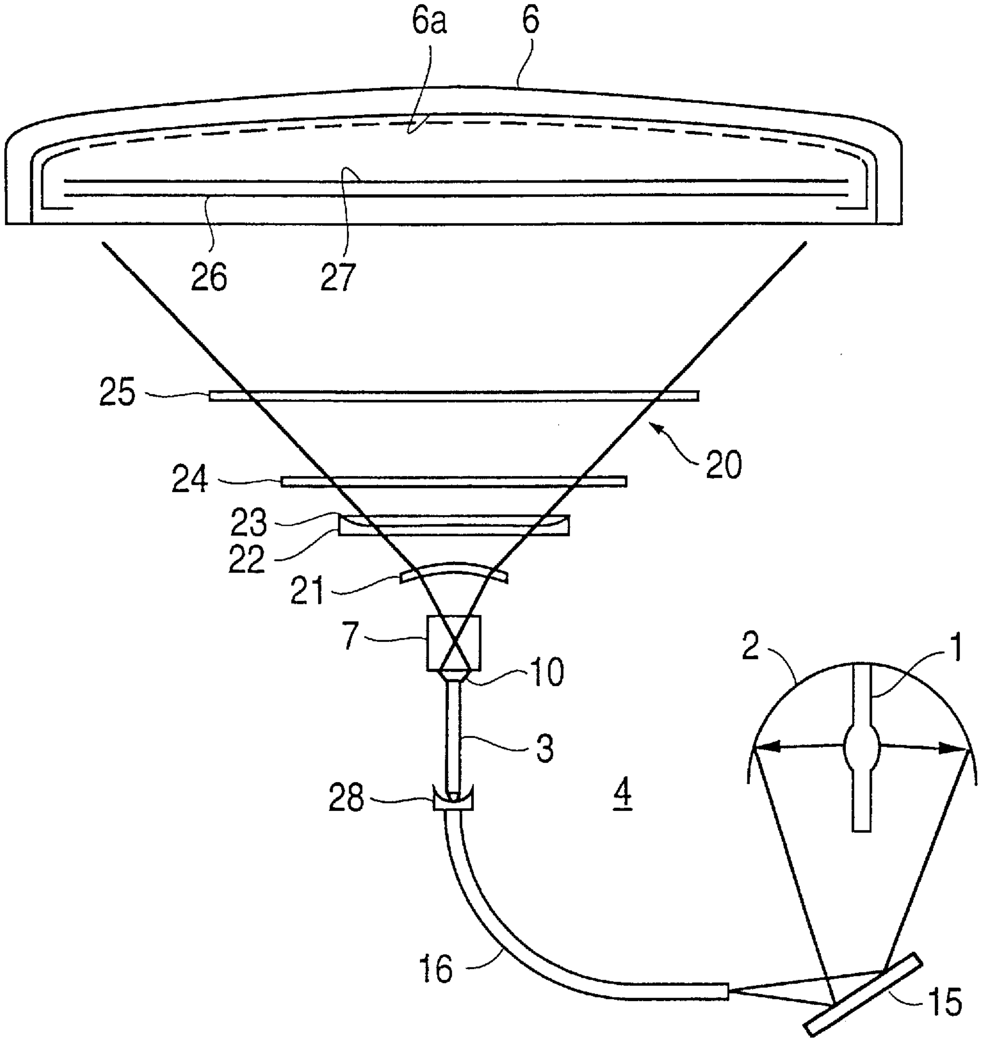
FIG. 9 shows exposure equipment of the present invention including a correction lens.

FIG. 9 shows exposure equipment of Example 3 of the present invention. An exposure shape correction lens system 28 including a cylindrical lens is disposed before the incident end of optical integrator 3.

Figure 10A:
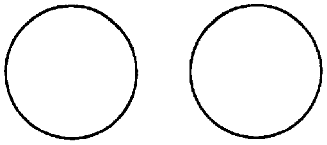
FIGS. 10A and 10B show an exposed shape on an exposure area.
Figure 10B:
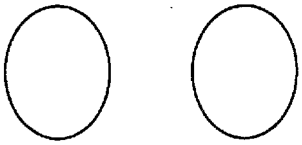

When a same mask which is used for a conventional exposure equipment is used for the exposure equipment of the present invention, the exposed shape on an exposure area 6*a* does not become a desired one as shown in FIG. 10(*a*) but it happens to become thin along horizontal direction as shown in FIG. 10(*b*). In this case, the exposure correction lens 28 realizes a desired shape.

Figure 11A:
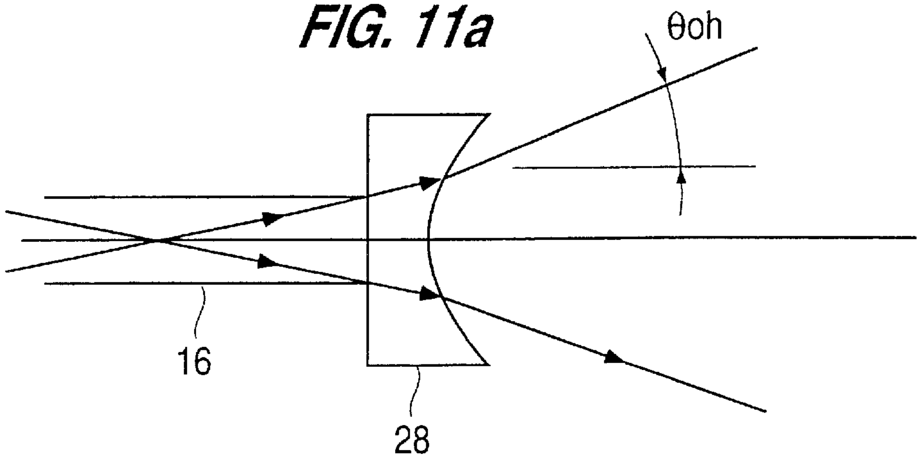
FIGS. 11A and 11B show lens shape of an exposure correction lens system and radiant angle along horizontal and vertical directions.
Figure 11B:
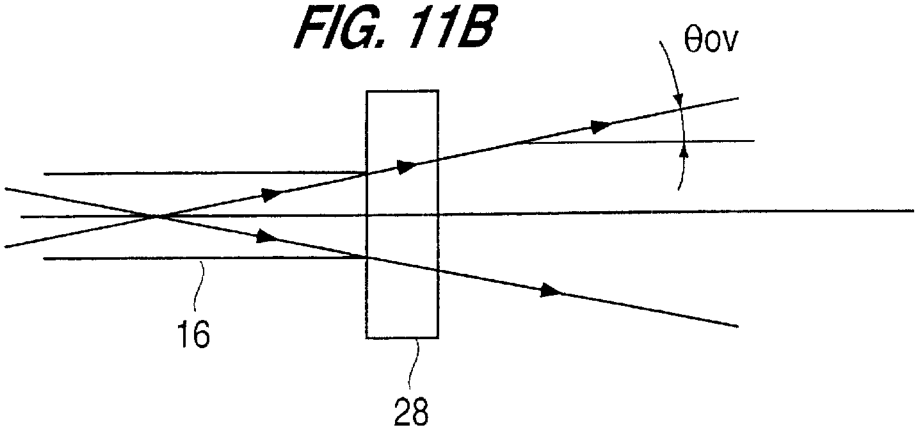

FIG. 11 shows the radiant light from the exposure correction lens 28 including a cylindrical lens. FIG. 11(*a*) shows radiation along the horizontal direction and FIG. 11(*b*) along the vertical direction. It is possible to make the horizontal radiant angle $\theta_{0h}$ larger than the vertical radiant angle $\theta_{0v}$ by changing the shape of the exposure correction lens 28. The light is incident on one end of optical integrator 3 at an incident angle of $\theta_{0h}$ and $\theta_{0v}$ described above and is repeatedly reflected inside the optical integrator and is integrated.

Figure 12A:
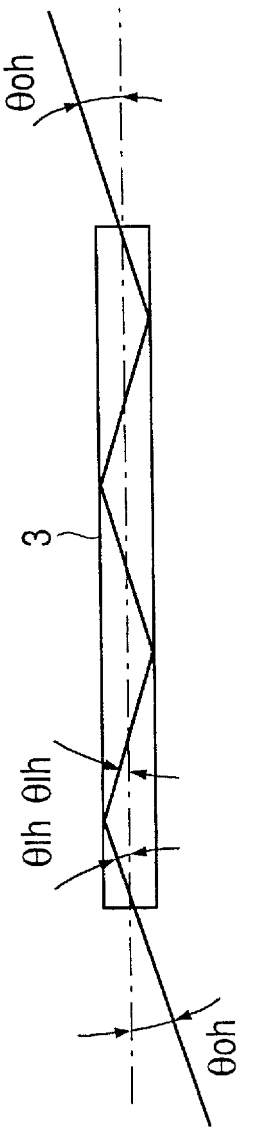
FIGS. 12A and 12B show how light is incident on one end of an optical integrator and how the light irradiates from the other end.
Figure 12B:
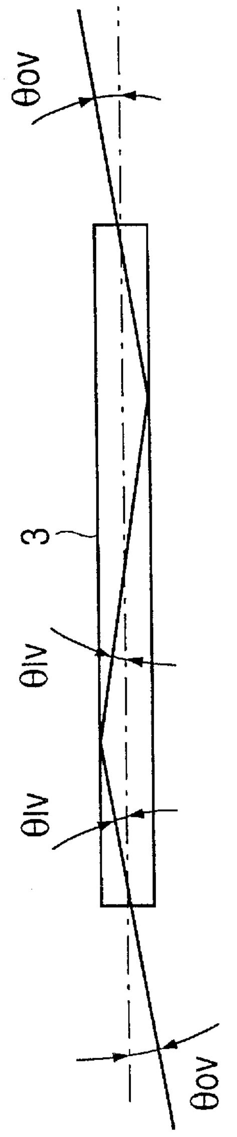

As shown in FIG. 12A and 12B, the advance angles $\theta_{1h}$ and $\theta_{1v}$ do not change by repeated reflection inside the optical integrator. The radiant light is irradiated from the other end of optical integrator at radiant angles which are the same as the incident angles $\theta_{0h}$ and $\theta_{0v}$.

Figure 13A:
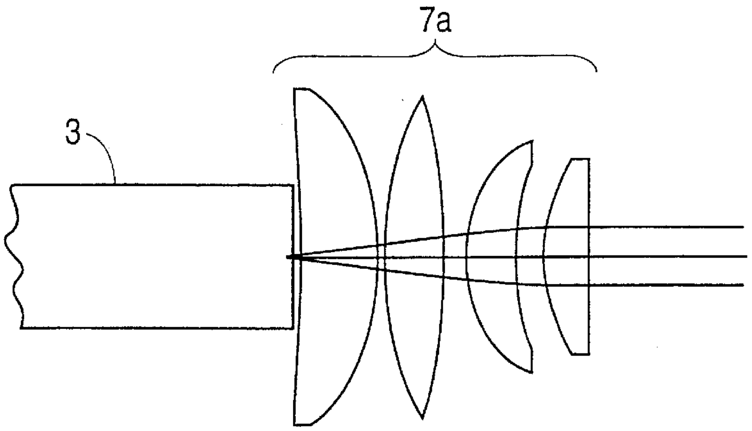
FIGS. 13A, 13B, and 13C show a light intensity distribution dependent on the radiant angle of the light irradiated from an optical integrator and a light intensity distribution dependent on the distance from the center axis of light irradiated from a telecentric lens system.
Figure 13B:
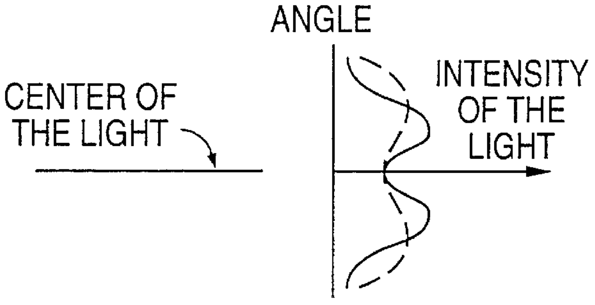

Thus, the horizontal light intensity distribution of radiant light from optical integrator 3, as shown in FIG. 13A changes from a distribution shown by a solid line in FIG. 13B to a distribution shown by a dotted line in FIG. 13B with respect to the radiant angle. The radiant light irradiated from a telecentric lens of an aperture lens system is shown in FIG. 13C.

Figure 13C:
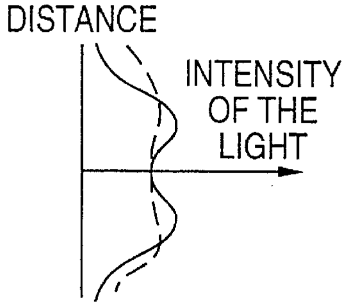
Figure 14B:
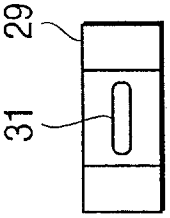
FIG. 14B PRIOR ART
FIG. 14 shows how a horizontal light exposure is performed according to the prior art.
Figure 14A:
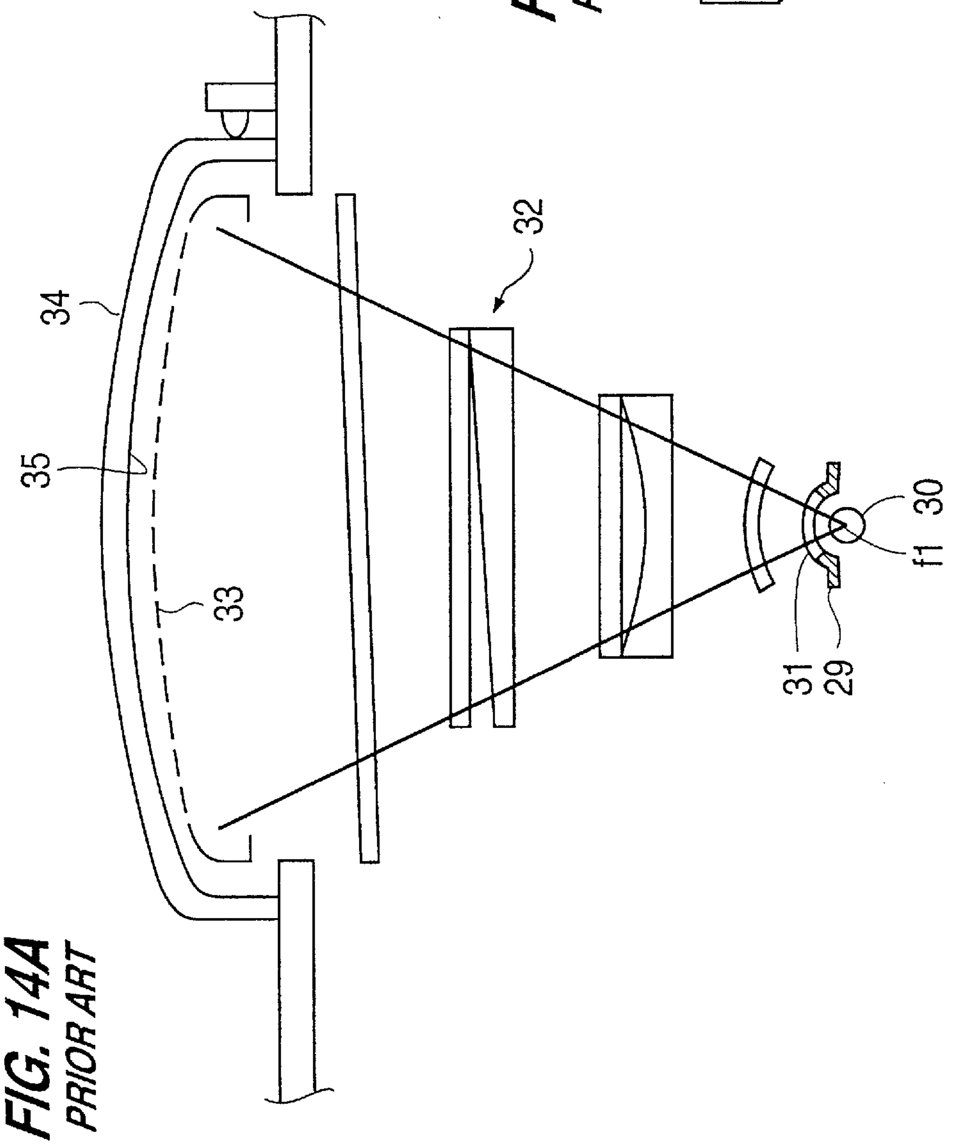
FIG. 14A PRIOR ART
Figure 15:
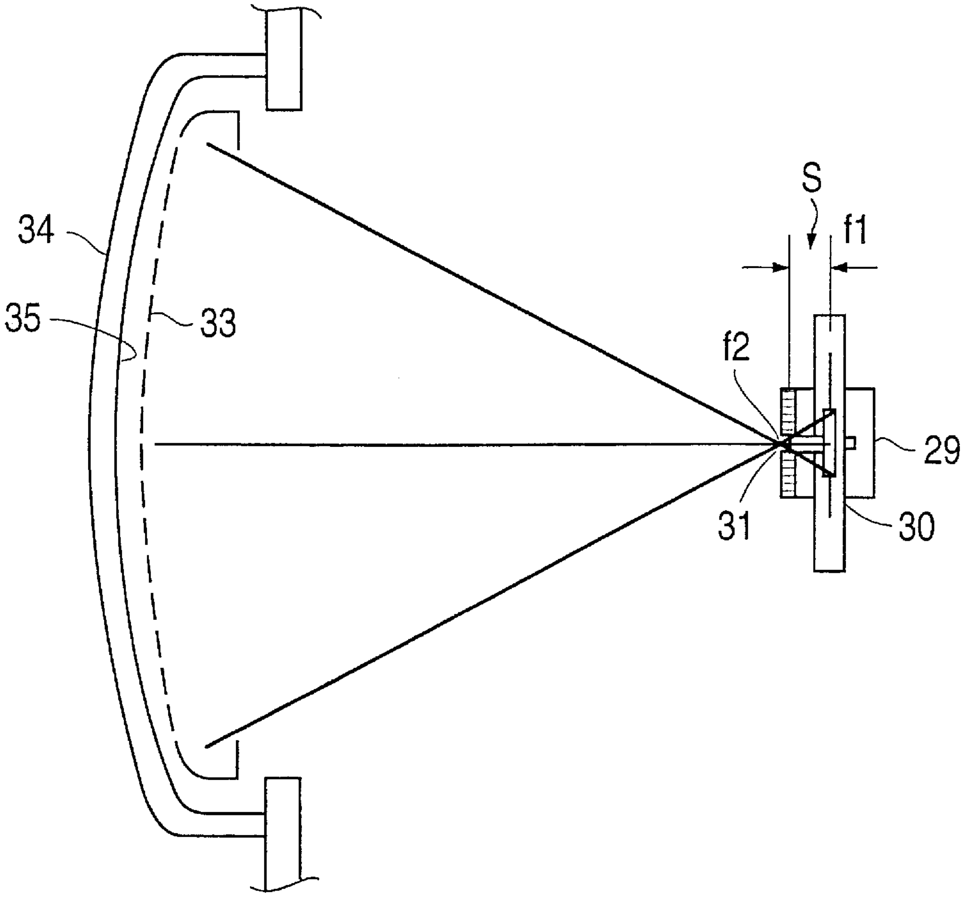
FIG. 15 PRIOR ART
FIG. 15 shows how a vertical light exposure is performed according to the prior art.

FIG. 13C shows the horizontal light intensity distribution in relation to the distance from the center axis of light. The exposure distance toward the horizontal direction increases and the exposed shape becomes the desired shape as shown in FIG. 12(*a*). In the present example, the exposure shape correction lens 28 is a cylindrical lens. An anamorphic lens can also be used as an exposure shape correction lens.

We claim:

1. Exposure equipment for use in fabrication of a display tube having an exposure area, a vertical deflection point of an electron beam, and a horizontal deflection point of the electron beam, said exposure equipment comprising:

a light source for generating light;

a light gathering device for gathering the light generated by said light source;

an optical integrator for receiving, at one end thereof, the light gathered by said light gathering device, integrating the light, and radiating uniform integrated light from another end of said optical integrator; and a lens system for forming diffused light, including vertically diffused light and horizontally diffused light, from the uniform light radiated from said optical integrator, and for projecting the diffused light, including the vertically diffused light and the horizontally diffused light, onto the exposure area of the display tube, said lens system including an astigmatism which forms a virtual focus of the vertically diffused light and a virtual focus of the horizontally diffused light such that the virtual focus of the vertically diffused light corresponds in position to the vertical deflection point of the display tube, and such that the virtual focus of the horizontally diffused light corresponds in position to the horizontal deflection point of the display tube.

2. Exposure equipment as claimed in claim 1, wherein said lens system comprises:

an aperture lens for transforming the light radiated from said optical integrator into a spot light having a predetermined size; and a projection lens for projecting the light from said aperture lens onto the exposure area of the display tube.

3. Exposure equipment as claimed in claim 2, wherein said aperture lens comprises a telecentric optical system.

4. Exposure equipment as claimed in claim 2, further comprising:

an exposure shape correction lens system, upstream of said one end of said optical integrator, including an anamorphic lens system which changes optical characteristics along a horizontal direction and a vertical direction of the light gathered by said light gathering device.

5. Exposure equipment as claimed in claim 1, further comprising:

an optical fiber for transmitting the light gathered by said light gathering device to said optical integrator.

6. Exposure equipment as claimed in claim 1, wherein said aperture lens comprises a telecentric optical system.

7. Exposure equipment as claimed in claim 1, further comprising:

an exposure shape correction lens system, upstream of said one end of said optical integrator, including an anamorphic lens system which changes optical characteristics along a horizontal direction and a vertical direction of the light gathered by said light gathering device.

8. Exposure equipment as claimed in claim 1, wherein said optical integrator is rod shaped.

9. Exposure equipment as claimed in claim 8, wherein said optical integrator has a square shaped cross section.

10. Exposure equipment as claimed in claim 8, wherein said optical integrator has a circular shaped cross section.

11. Exposure equipment as claimed in claim 8, wherein said optical integrator has a triangular shaped cross section.

12. A method for exposure for use during fabrication of a display tube having a display area, a vertical deflection point of an electron beam, and a horizontal deflection point of the electron beam, said method comprising:

generating a light from a light source;

gathering the light from the light source;

integrating the light gathered from the light source so as to form light having uniform intensity;

radiating the light having uniform intensity;

focusing the radiated light to form a spot of light having a specific size;

projecting the spot of light onto the display area of the display tube by diffusing the spot of light from a first virtual origin and a second virtual origin such that the first virtual origin corresponds in position to the vertical deflection point of the display tube, and such that the second virtual origin corresponds in position to the horizontal deflection point of the display tube.

13. A method as claimed in claim 12, further comprising:

transmitting the light gathered from the light source through an optical fiber prior to integrating the light.

14. Exposure equipment for use in fabrication of a display tube having an exposure area, said exposure equipment comprising:

a light source for generating light;

a light gathering device for gathering the light generated by said light source, said light gathering device having a location within said exposure equipment selected so as to minimize the size of said exposure equipment;

an optical integrator;

an optical fiber for transmitting the light gathered by said light gathering device from said location of said light gathering device to said optical integrator, and for preventing optical interference, wherein said optical integrator is operable to receive the light at one end of said optical integrator, to integrate the light, and to radiate uniform light from another end of said optical integrator; and a lens system for forming virtual focuses and for diffusing and projecting the uniform light from said virtual focuses to the exposure area of the display tube.

* * * * *